United States Patent [19]

Bote

[11] Patent Number: 5,294,063
[45] Date of Patent: Mar. 15, 1994

[54] DEBRIS VACUUM SELECTIVELY USABLE AS A HAND-HELD AND WHEELED UNIT

[75] Inventor: Scott J. Bote, Lindenhurst, Ill.
[73] Assignee: Echo, Incorporated, Lake Zurich, Ill.
[21] Appl. No.: 787,373
[22] Filed: Nov. 4, 1991
[51] Int. Cl.⁵ ............................................. B02C 18/06
[52] U.S. Cl. ................................. 241/101.7; 30/122; 241/101.1
[58] Field of Search ............. 241/55, 56, 101.1, 101.7; 30/122

[56] References Cited

U.S. PATENT DOCUMENTS

| | | | |
|---|---|---|---|
| Re. 33,050 | 9/1989 | Tuggle et al. | 15/330 |
| 2,105,803 | 1/1938 | Barnes . | |
| 2,987,983 | 6/1961 | Solzman . | |
| 3,608,838 | 9/1971 | Lundin . | |
| 3,618,157 | 11/1971 | Bassin . | |
| 3,712,353 | 1/1973 | Ferry . | |
| 3,716,089 | 2/1973 | Bateman . | |
| 3,716,198 | 2/1973 | Lautzenheiser . | |
| 3,790,986 | 2/1974 | Burger | 241/55 X |
| 3,860,181 | 1/1975 | Enters et al. | 241/55 |
| 3,929,236 | 12/1975 | Koturov | 241/55 |
| 3,968,938 | 7/1976 | Ruhl et al. | 241/101.1 |
| 4,074,869 | 2/1978 | Johnson | 241/55 |
| 4,076,460 | 2/1978 | Roof | 241/101.1 X |
| 4,117,983 | 10/1978 | Browning | 241/55 |
| 4,187,577 | 2/1980 | Hansen et al. | 30/122 X |
| 4,223,419 | 9/1980 | Sato et al. | 15/327 |
| 4,227,280 | 10/1980 | Comer | 15/330 |
| 4,242,794 | 1/1981 | Peterson | 30/122 |
| 4,250,868 | 2/1981 | Frye | 126/121 |
| 4,286,675 | 9/1981 | Tuggle | 173/163 |
| 4,288,886 | 9/1981 | Siegler | 15/330 |
| 4,290,165 | 9/1981 | Hiramatsu et al. | 15/330 |
| 4,318,203 | 3/1982 | Satoh et al. | 15/344 |
| 4,325,163 | 4/1982 | Mattson et al. | 15/330 |
| 4,344,370 | 8/1982 | Smith et al. | 110/162 |
| 4,451,951 | 6/1984 | Satoh | 15/330 |
| 4,461,055 | 6/1984 | Zerrer et al. | 15/344 |
| 4,644,606 | 2/1987 | Luerken et al. | 15/330 |
| 4,875,630 | 10/1989 | Carlson | 241/56 |
| 4,951,882 | 8/1990 | Ober | 241/55 |

OTHER PUBLICATIONS

Paramount GB-150 Gas Powered Blower and accessories brochure, No. 4-85-10M.
TrimRite Advertisement.
Catalog Advertisement of McCulloch Mac-Vac.
Echo Vac-Sac Advertisement.
Ryobi Brochure.
Power Blowers Parts Catalog, Model Nos. PB-1000 and PB-1010.
Echo Operator's Manual Power Blower, Model Nos. PB-1000 and PB-1010.
Black & Decker Lawn and Garden Products 1990-1991 Catalog, pp. 12, 13 and 15.

Primary Examiner—Douglas D. Watts
Attorney, Agent, or Firm—Wood, Phillips, VanSanten, Hoffman & Ertel

[57] ABSTRACT

The combination of: a) a portable vacuum unit useable independently in a portable vacuum mode and having a housing defining an intake opening into which debris to be picked up is drawn and an outlet opening in communication with the intake opening, and structure for developing suction at the intake opening and for directing debris drawn through the intake opening to the outlet opening for expulsion thereat; and b) a mobile support for the portable vacuum unit and having a frame and structure on the frame for facilitating movement of the mobile support against and relative to a subjacent surface carrying the mobile support. The combination further contemplates cooperating structure on the mobile support and portable vacuum unit for releasably holding the portable vacuum unit in an operative position on the mobile support wherein the vacuum unit intake opening is positioned to pick up debris on a subjacent surface on which the mobile support is carried.

23 Claims, 4 Drawing Sheets

DEBRIS VACUUM SELECTIVELY USABLE AS A HAND-HELD AND WHEELED UNIT

BACKGROUND OF THE INVENTION

Field of the Invention

This invention relates to apparatus for picking up light debris such as natural yard waste, to include matter such as leaves, pine needles, small twigs, etc. and, more particularly, to a device which can, as desired by the user, be operated as a portable hand-held unit or a ground-engaging wheeled unit.

Background Art

Vacuuming apparatus, for picking up debris such as natural yard waste, have been around for years. These apparatus are generally classifiable as either portable hand-held units or mobile ground engaging units normally utilizing a wheeled undercarriage support frame.

Many of the portable units are convertible for use selectively as a blower or a vacuum. Typically, the hand-held portable unit, in the vacuum mode, has a power head with an integral housing in which an impeller is operated to draw matter through an intake opening and cause expulsion thereof through an outlet opening in the housing. The housing normally has an integrally formed handle which facilitates manipulation of the device. An intake tube/conduit can be attached releasably to the housing at the intake opening so that suction is created at the distal end of the tube/conduit which can be precisely placed over matter to be picked up. Alternatively, with the unit in the blower mode, an outlet tube is releasably attached at the outlet opening to controllably direct a high pressure air stream that is exhausted at the outlet.

The assignee of the instant invention currently markets two portable, hand-held vacuums/blowers which it designates as its Model Nos. PB-1000 and PB-1010. These units have been highly successful in operation and have been favorably accepted in the marketplace. These units, while being very lightweight in construction and well balanced in the hand of the user, exhibit exceptional suction and discharge capabilities.

In spite of the effectiveness of the assignee's commercially available units, they do not meet all consumer demands. Some consumers do not wish to manually hold the units in an elevated position over the debris to be vacuumed. Further, it can be difficult and relatively time consuming to thoroughly cover a large area, as when vacuuming a yard blanketed with leaves, with an intake tube/conduit having a relatively small diameter at its inlet opening.

To meet these demands, prior art designers have developed relatively large, wheeled units with a large pickup hood/shroud and relatively extensive framework to support the operating mechanism therefor and a collection receptacle for the debris that is picked up. Exemplary of such a structure is that shown in U.S. Pat. No. 3,712,353, to Ferry. While such devices have utility in terms of vacuuming large yards, they have some inherent limitations and drawbacks.

First of all, such large units have virtually no utility in vacuuming between trees and shrubs and in other tight spaces. Additionally, the units, which, as a rule, are quite obtrusive, must be stored inside and thus require a substantial amount of storage space, which, for most homeowners, is at a premium.

In short, there are limitations and drawbacks associated with each of the portable, hand-held vacuum units and the larger wheeled vacuum units. The result of this is that consumers commonly purchase both types of units to exploit the advantages of each. The purchase of both types of equipment involves a considerable expense and increases storage requirements for the user.

SUMMARY OF THE INVENTION

The present invention is specifically directed to overcoming the above enumerated problems in a novel and simple manner.

More specifically, the present invention has as its principal objective the provision of a combination device having a portable vacuum unit that is useable independently and a support therefor which allows the portable vacuum unit thereon to be moved readily relative to a subjacent surface through the support.

More specifically, the invention contemplates the combination of: a) a portable vacuum unit useable independently in a portable vacuum mode and having a housing defining an intake opening into which debris to be picked up is drawn and an outlet opening in communication with the intake opening, and structure for developing suction at the intake opening and for directing debris drawn through the intake opening to the outlet opening for expulsion thereat; and b) a mobile support for the portable vacuum unit and having a frame and structure on the frame for facilitating movement of the mobile support against and relative to a subjacent surface carrying the mobile support. The combination further contemplates cooperating structure on the mobile support and portable vacuum unit for releasably holding the portable vacuum unit in an operative position on the mobile support wherein the vacuum unit intake opening is positioned to pick up debris on a subjacent surface on which the mobile support is carried.

By releasing the portable vacuum unit from the mobile support therefor, the vacuum unit can be used in its portable vacuum mode, independently of the mobile support. Consequently, with one structure, the operator realizes the advantages of both a portable, hand-held unit and a device in which a portable hand-held unit is consistently held in an optimum position and readily movable over large areas to effect uniform vacuuming thereof. That is, with the device in the portable vacuum mode, the user can readily vacuum in tight spaces such as between trees and bushes. The operator can place the portable vacuum unit on the mobile support and move the mobile support to conveniently vacuum large areas, such as yards blanketed with leaves.

To facilitate operation of the portable vacuum unit, a carrying handle is provided.

An intake tube/conduit is provided to be releasably attached to the vacuum unit in its portable vacuum mode to facilitate access to debris in tight areas.

In one form of the invention, each of the portable vacuum unit and mobile support has a rim, with the rims being fit one within the other with the portable vacuum unit in its operative position. The rims are releasably maintained, one against the other, as by a clamp, which is preferably adjustable. A conventional hose-type clamp is suitable for this purpose.

To facilitate the vacuuming of large areas, the mobile support has a pick-up hood/shroud with an internal chamber and an inlet opening, which inlet opening is preferably substantially larger than the intake opening defined by the portable vacuum unit housing. The intake opening on the portable vacuum unit is in communication with the hood/shroud inlet opening through the internal hood/shroud chamber so that debris picked up at the hood/shroud inlet opening is drawn through the hood/shroud chamber and the housing intake opening to be expelled at the outlet opening.

In one form of the invention, a receptacle is provided to accumulate debris expelled at the outlet opening of the portable vacuum unit.

In an alternative form, a discharge chute can be provided for controllably directing debris from the outlet opening of the portable vacuum unit onto a subjacent surface on which the mobile support is carried.

The invention further contemplates that a separate handle be provided on the mobile support to effect movement thereof with the portable vacuum unit in its operative position on the support. The receptacle can be conveniently attached to the mobile support handle.

Preferably, the mobile support has wheels thereon to facilitate its movement. The use of larger wheels at the rear facilitates tipping of the unit with at least one wheel forwardly thereof to balance the device.

In one form of the invention, suction in the portable vacuum unit is developed by a rotatable impeller and there is a cutting structure that rotates with the impeller to shred debris drawn in by suction before it impacts the impeller.

The invention further contemplates a vacuuming apparatus having: a mobile support; a hood/shroud having an inlet opening, an internal chamber in communication with the inlet opening, and an outlet opening; structure for mounting the hood/shroud to the mobile support so that the hood/shroud inlet opening is in close proximity to a subjacent surface on which the mobile support is carried; structure for developing suction at the inlet opening of the hood/shroud to cause debris picked up at the hood/shroud inlet opening to be communicated through the hood/shroud chamber to the hood/shroud outlet opening, and structure for connecting a tube to the hood/shroud and for establishing communication between the tube connected to the hood/shroud and internal hood/shroud chamber.

The invention also contemplates the combination of the above structure with a tube that can be connected to the hood/shroud in communication with the hood/shroud internal chamber.

In one form of the invention, structure is provided for selectively blocking the hood/shroud inlet opening to maximize suction developed in a tube connected to the hood/shroud in communication with the hood/shroud internal chamber.

The invention further contemplates an attachment for a tube connected to the hood/shroud opening in communication with the hood/shroud internal chamber. The attachment has a handle to facilitate manipulation thereof.

In a preferred form, the blocking structure for the inlet opening on the hood/shroud is a converter plate that is removably held in place by at least one bolt. In one form of the invention, the hood/shroud and converter plate are relatively configured so that the converter plate can be assembled to and removed from the hood/shroud only by relative lateral movement between the hood/shroud and converter plate.

To improve the versatility of the inventive device, the portable vacuum unit is convertible, to be usable as a portable blower unit.

DETAILED DESCRIPTION OF THE DRAWINGS

Figures 1, 2:
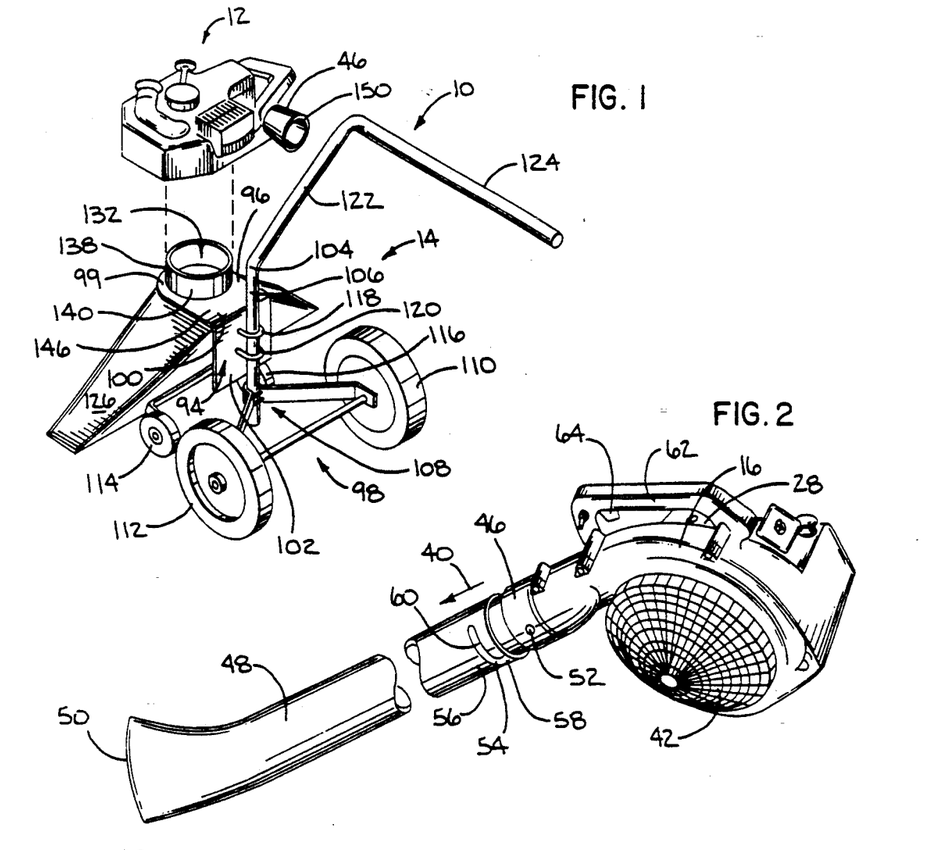
FIG. 1 is an exploded perspective view of a combination device according to the present invention and consisting of a portable blower/vacuum unit and a mobile support therefor.
FIG. 2 is a perspective view of the isolated portable blower/vacuum unit in its blower mode.

In FIG. 1, a combination device, according to the present invention, is shown at 10, to include a portable blower/vacuum unit at 12 and an associated mobile support 14 onto which the blower/vacuum unit 12 is removably mountable. The invention contemplates that the portable blower/vacuum unit 12 can be used by itself apart from the mobile support 14, as to work in tight areas such as between trees and bushes, or in combination with the mobile support 14 to facilitate vacuuming of large, open areas, such as lawns with leaves and other light natural debris thereon. The description below will begin with the operation of the portable blower/vacuum unit 12 apart from the mobile support 14.

As seen most clearly in FIGS. 1–6, the portable blower/vacuum unit 12 has a housing 16 defining an intake opening 18 for debris to be drawn in by suction and an outlet opening 20 through which the incoming debris is expelled. The housing 16 defines a chamber 22 that communicates between the intake opening 18 and outlet opening 20. The housing 16 defines a subchamber 24 for an impeller 26 driven rotatably by an engine 28 through a shaft 30 about an axis 32. The rotating impeller 26 causes suction to be developed at the intake opening 18 to draw in debris such as leaves 34 in the direction of arrow 36 against the impeller vanes 38 whereupon the vanes 38 centrifugally propel the leaves 34 in the direction of arrow 40 through the outlet opening 20.

The portable blower/vacuum unit 12 is configured to be useable selectively as either a blower or a vacuum. The portable blower/vacuum unit 12 is shown in the blower mode in FIG. 2 and in the vacuum mode in FIGS. 3 and 4.

In the blower mode of FIG. 2, a perforate cover 42 embraces a rim 44 which surrounds the housing intake opening 18. The cover 42 allows air to be drawn in by the impeller 26 but prevents inadvertent contact of the impeller 26 by the user and the drawing in of large objects against the impeller 26.

A high velocity air flow is directed through the outlet opening 20 defined by a connector 46, integrally formed with the housing 16. The proximal end of an extension tube 48 is attachable to the connector 46 and has a flared distal end 50 to cause the discharging air to fan out. The tube 48 is removably connectable through a dimple 52 on the connector 46 which is movable guidingly in an L-shaped slot 54 at the proximal end 56 of the tube 48. The dimple 52 is forced through one leg 58 of the slot 54 whereupon relative rotative movement between the tube 48 and connector 46 seats the dimple 52 in the other leg 60 of the slot 54.

An inverted, U-shaped handle 62 is provided to hold the unit 12 when it is operated as a blower. A depressible trigger 64 controls the speed of the engine 28 and is conveniently located to be operable by the finger on the hand of the user grasping the handle 62.

Figure 3:
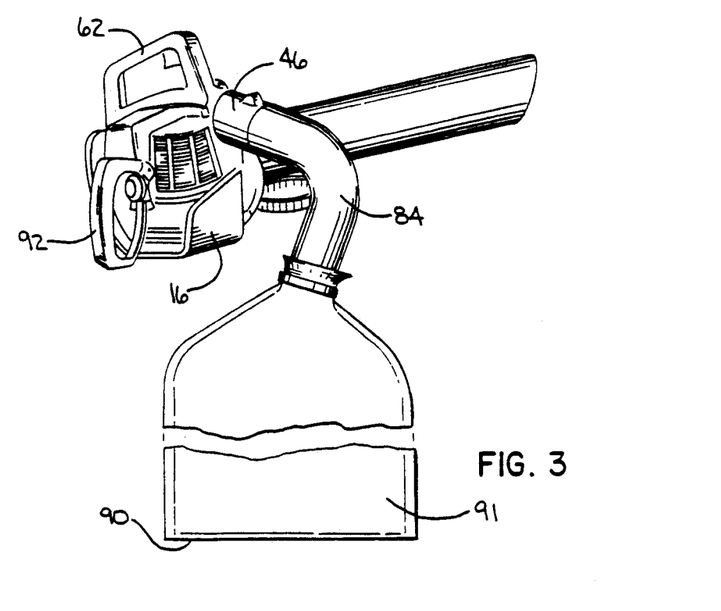
FIG. 3 is a perspective view of the isolated blower/vacuum unit in its vacuum mode.
Figure 4:
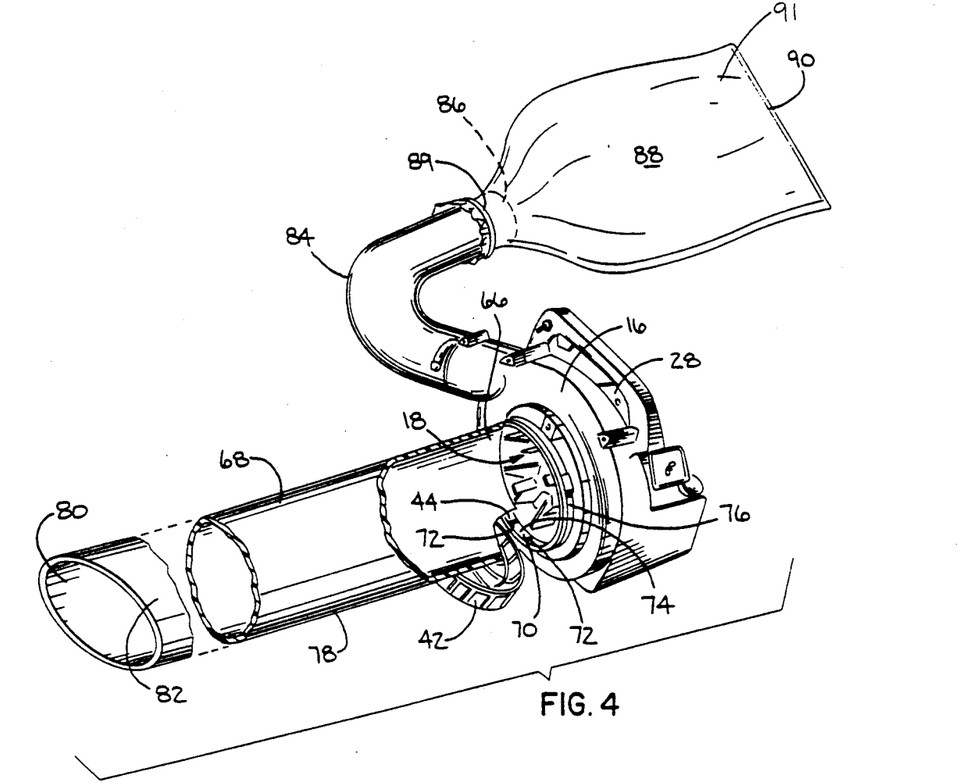
FIG. 4 is an enlarged perspective view of the blower/vacuum unit in its vacuum mode and partially broken away to reveal a cutting structure to reduce the volume of debris expelled from the portable blower/vacuum unit.

To convert the portable blower/vacuum unit 12 to the vacuum mode, the cover 42 is moved away from the rim 44 to expose the intake opening 18. The proximal end 66 of an intake tube/conduit 68 is closely press fit to the inside surface 70 of the rim 44. The rim 44 has axially extending, equidistantly, circumferentially spaced slots 72 extending therethrough to define radially deflectable tabs 74. A hose-type clamp 76 surrounds the rim 44, bending the tabs 74 radially inwardly and thereby captively holding the rim 44 against the outer surface 78 of the tube/conduit 68. The clamp 76 can be loosened to remove the tube/conduit 68. The tube/conduit has an inlet opening 80 at its distal end 82. The distal end 82 is placed in the vicinity of the debris that is to be vacuumed by the blower/vacuum unit 12.

In place of the extension tube 48, an elbow 84 is attached to the connector 46 and has a free end 86 to which a receptacle 88 is attached to accept and accumulate debris that is drawn in through the tube/conduit 68 and exhausted through the outlet opening 20. The receptacle 88 is releasably held in place on the elbow 84 by a strap 89, which has VELCRO ® fastener thereon to facilitate attachment and release of the receptacle 88. The receptacle has a zipper 90 on its one end 91 to facilitate emptying of the receptacle 88. The elbow 84 is shown to make approximately a 90° angle. However, the particular angle is a matter of design choice.

An extra handle 92 provided on the housing 16 to be used in conjunction with the handle 62 to conveniently situate the distal end 82 of the tube/conduit 68 in the vicinity of the debris to be vacuumed.

It can be seen that the user has the option of operating a single portable device 10 as either a blower or a vacuum, with the change between the two being readily accomplished. Such units are currently being commercially sold by the assignee herein as its Models PB-1000 and PB-1010.

The present invention not only contemplates the versatility of using a portable blower/vacuum unit in either blower or vacuum modes, but also the mounting of the portable blower/vacuum unit 12 on the mobile support 14, described in detail hereafter, to allow the blower/vacuum unit 12 to be conveniently wheeled around a subjacent surface as to, for example, vacuum a blanket of leaves on a large lawn, or the like.

More specifically, as seen in FIGS. 1 and 5–9, the mobile support 14 consists of a frame 94 that defines a support base 96 for the portable blower/vacuum unit 12 and a wheeled undercarriage 98 to facilitate rolling movement of the device 10 along a subjacent surface on which the device 10 is carried. The support base 96 consists of a mounting plate 99 having a horizontal wall 100 and a vertical wall 102 bent at 90° to the wall 100 and integral therewith.

The mounting plate 99 is held to the undercarriage 98 by a generally L-shaped, tubular handle 104. The handle 104 has an upright section 106 that is secured to a bracing structure 108 that extends between and fixedly maintains the relative positions of the wheels 110, 112, 114, 116 on the undercarriage 98. A pair of U-bolts 118, 120 surround the upright handle section 106 and are secured to the vertical wall 102 of the mounting plate 99 to hold the mounting plate 99 fixedly in its operative position of FIG. 1. The handle 104 has a midportion 122 extending angularly rearwardly from the upright section 106 of the handle 104 and continuing into a horizontal arm 124, that is supported in cantilever fashion and is situated to be readily accessible to a user of the device 10 for conveniently pushing, pulling and turning the device 10.

Depending from the mounting plate 99 is a hood/shroud 126 defining an internal pick-up chamber 128. The hood/shroud 126 has a lower inlet opening 130 and an upper outlet opening 132 communicating with each other through the chamber 128. The chamber has a rectangular cross section with its longer dimension extending laterally of the device 10. The hood/shroud 126 increases progressively in cross section between the outlet opening 132 and inlet opening 130. As seen most clearly in FIGS. 7 and 8,, the lower edge 134 of the hood/shroud 126 at the inlet opening 130 is slightly spaced from a subjacent surface 136 on which the wheels 110, 112, 114, 116 rest.

An annular rim 138 surrounds the outlet opening 132 of the hood/shroud 126. To assemble the blower/vacuum unit 12 to the mobile support 14, the rims 44, 138 are placed one within the other in coaxial relationship. The rim 44 on the blower/vacuum unit 12 closely surrounds the outer surface 140 of the rim 138 on the mobile support 14. As in connecting the rim 44 to the tube/conduit 68, as previously described, the same hose-type clamp 76 is employed. The free annular edge 141 of the rim 44 can be slightly elevated above a shoulder 142 defined by a step 144 on the hood/shroud 126, as shown in FIG. 9, or brought into engagement with the shoulder 142 so that downward movement of the unit 12 can be consistently arrested in the same position relative to the support 14, as shown in FIG. 8.

With the blower/vacuum unit 12 operatively connected, the free edge 150 of the connector 46 projects rearwardly beyond the vertical wall 102 to allow attachment of the receptacle 88 thereto, as previously described. A support loop 152 on the receptacle 88 extends around the handle arm 124 to maintain the receptacle 88 in the elevated position, as shown clearly in FIG. 8.

Figure 5:
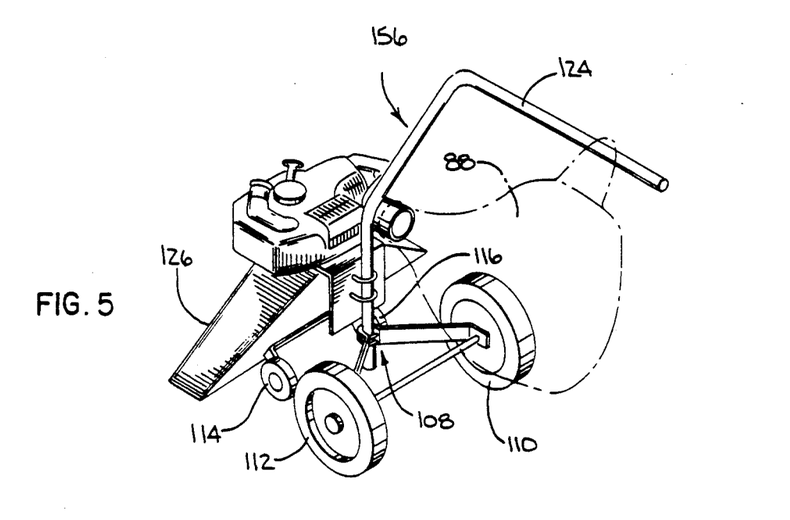
FIG. 5 is a perspective view of the portable blower/vacuum unit operatively connected to the mobile support.
Figure 6:
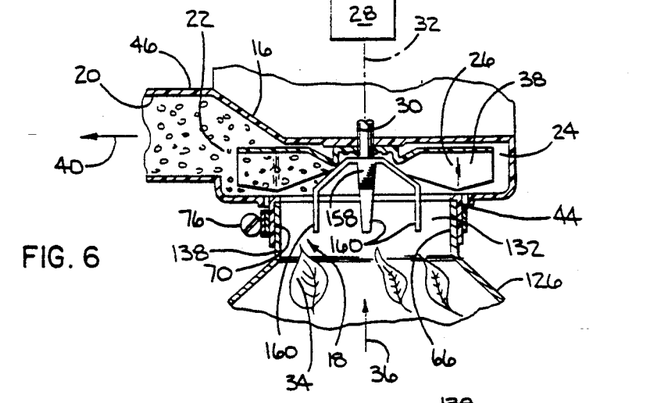
FIG. 6 is an enlarged, cross-sectional view of the connection between the portable blower/vacuum unit and the mobile support.
Figures 7, 8, 9:
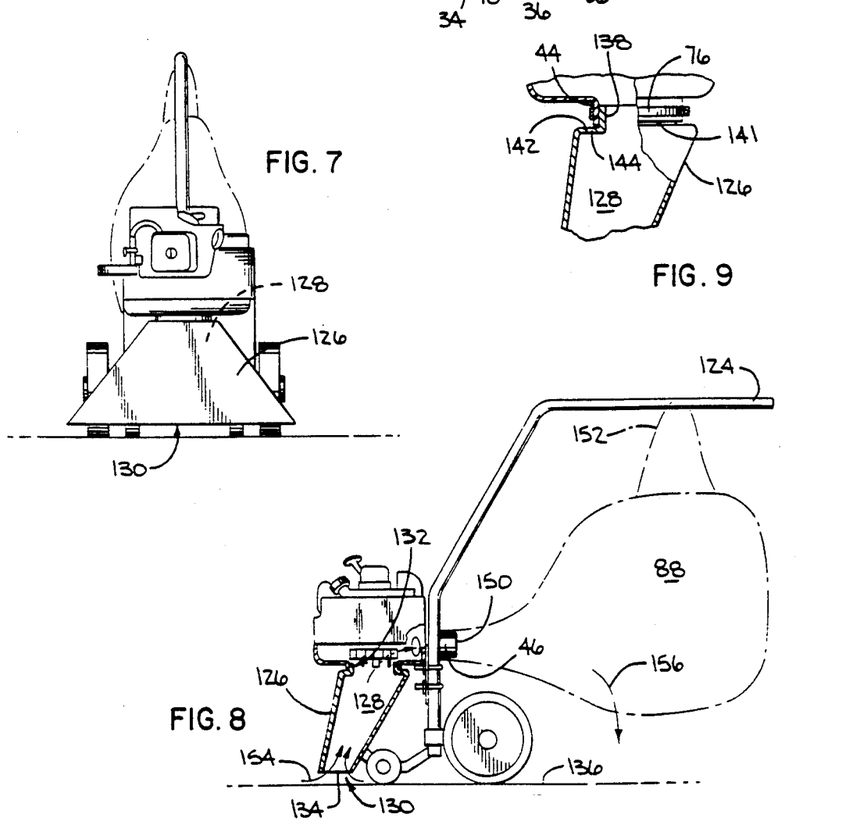
FIG. 7 is a front elevation view of the portable blower/vacuum unit operatively associated with the mobile support.
FIG. 8 is a side elevation view of the portable blower/vacuum unit operatively associated with the mobile support.
FIG. 9 is an enlarged, side elevation view of the connection between the portable blower/vacuum unit and the mobile support.

With the portable blower/vacuum unit 12 in its operative position of FIGS. 5, 7 and 8, the blower/vacuum unit 12 can be normally operated. In operation, debris from the surface 136 is drawn in the direction of arrows 154 through the hood/shroud inlet opening 130, through the hood/shroud chamber 128, through the outlet opening 132 in the hood/shroud 126, through the intake opening 18 in the housing 16 and out the outlet opening 20 and into the receptacle 88.

It can be seen that the operator can conveniently manipulate the device 10 through the arm 124. The larger rear wheels 110, 112 allow the device to be tipped in the direction of arrow 156 onto its back wheels 110, 112, to facilitate normal rolling when the device is not in use and turning of the device 10.

It can be seen that with the inventive device 10, the operator has the option of using the portable blower/vacuum unit 12 in the blower mode of FIG. 2, in the vacuum mode of FIG. 3, or as part of the mobile support 14. Thus a single device 10, according to the invention, is extremely versatile and useable for all different vacuuming purposes.

An additional feature which is incorporated into the invention is a cutting means 158, which is a subject of a separate co-pending application filed by the inventors herein. The cutting means 158 consists of four blades 160 (three shown) which rotate about the axis 32 and shred incoming debris 34 so that its size is reduced before impacting the impeller 26. The impeller 26 further reduces the size of the debris 34 before expulsion thereof.

Figures 10, 11, 12, 13, 14:
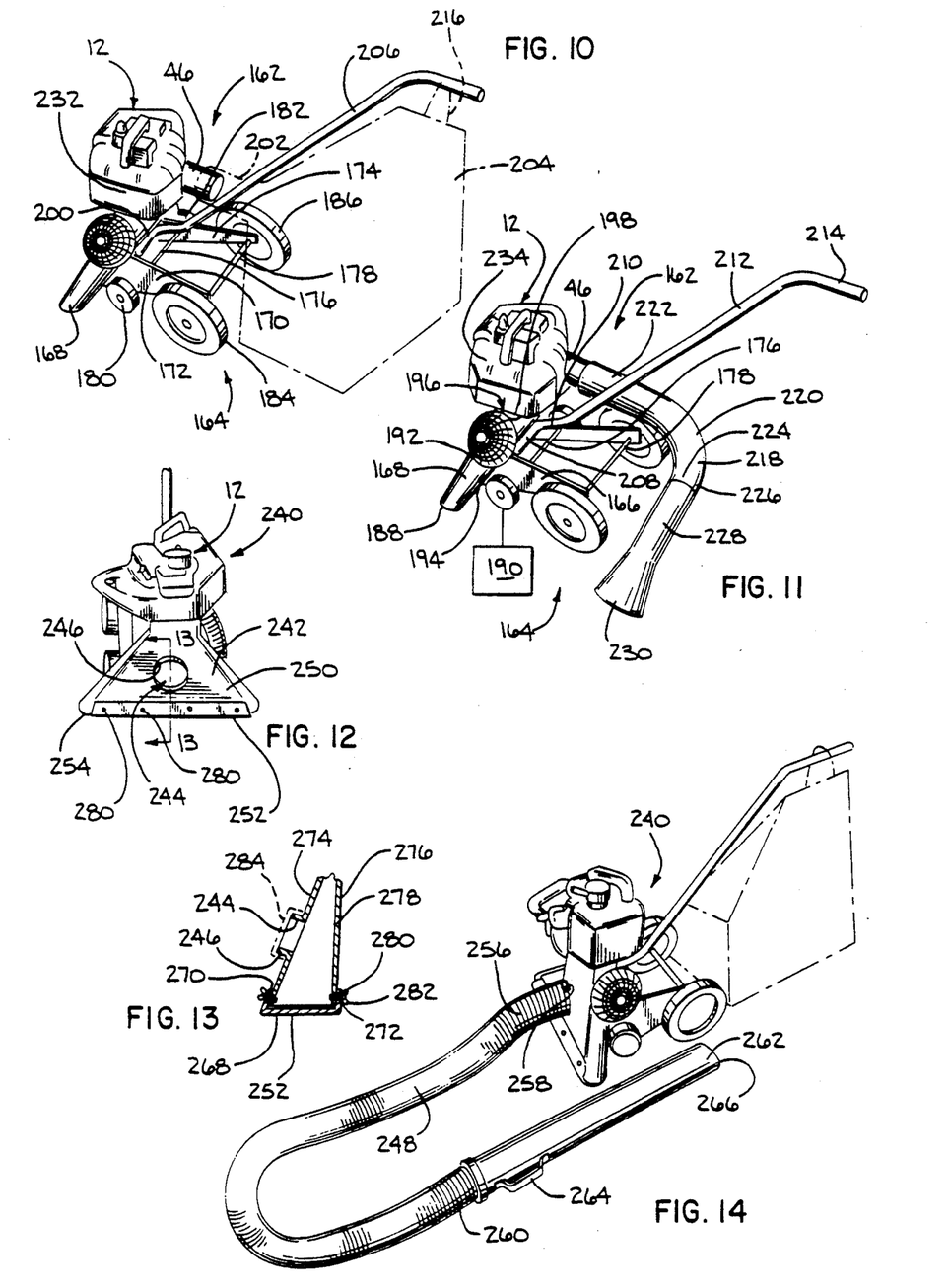
FIG. 10 is a rear perspective view of the portable blower/vacuum unit operatively associated with a modified form of mobile support, according to the present invention, and showing a flexible debris receptacle operatively connected to the portable blower/vacuum unit.
FIG. 11 is a view as in FIG. 10 with a discharge chute connected to the portable blower/vacuum unit in place of the receptacle.
FIG. 12 is a front elevation view of a portable blower/vacuum unit operatively connected to a mobile support that is modified from that shown in FIGS. 10 and 11 to include a connector for flexible tubing and having a converter plate connected so as to maximize vacuum developed at the connector.
FIG. 13 is a cross-sectional view of the hood/shroud, connector and converter plate, taken alone line 13—13 of FIG. 12.
FIG. 14 is a perspective view of the portable blower/vacuum unit and mobile support with a flexible tube operatively associated with the connector on the hood/shroud.

In FIGS. 10 and 11, modified forms of a combination device, according to the present invention, are shown at 162, to include the portable blower/vacuum unit 12, as previously described, in combination with a mobile support 164, which is slightly modified from the mobile support 14, described above.

The mobile support 164 consists of a wheeled undercarriage 166 and a forward hood/shroud 168 connected thereto. The undercarriage 166 has a rearwardly opening, U-shaped frame 170 with spaced legs 172, 174 thereon. Front and rear axles 176, 178, respectively, support a pair of front wheels 180, 182 and a pair of rear wheels 184, 186. The wheels 180, 182, 184, 186 cooperatively support an inlet opening 188 on the hood/shroud 168 at a predetermined height above a subjacent surface on which the device 162 is supported. In FIG. 11, a mechanism 190 is shown schematically for raising and lowering the front wheels 180, 182 relative to the frame 170 to thereby vary the height of the inlet opening 188.

The hood/shroud 168 has inverted, V-shaped front and rear walls 192, 194, which diverge slightly from top to bottom to define a progressively diminishing cross section from the inlet opening 188 to the hood/shroud outlet 196. The outlet 196 is defined by an annular rim/flange 198, that is substantially the same as that 138 previously described.

The base 200 of the U-shaped frame 170 is welded to the rear wall 194 of the hood/shroud 168 to define a unitary combination.

The portable blower/vacuum unit 12 is connected to the annular rim 198 in the same fashion as it is described to be connected to the annular rim 198 in the previously described embodiment. Consequently, a detailed description of that connection is omitted herefrom. As in the previously described embodiment, the connector 46 projects rearwardly beyond the hood/shroud 168 and base 200, to facilitate insertion thereof into the neck 202 of flexible receptacle 204.

To facilitate movement of the device 162, a handle 206, defined by a formed tube, is provided. The handle 206 has a connecting portion 208 that is bolted or otherwise suitably secured to the rear wall 194 of the hood/shroud 168 and frame base 200. Above the connector portion 208, the handle 206 has a short offset 210, a rearwardly and upwardly inclined main body 212, and an offset, horizontal portion 214, which can be readily gripped by the user. The horizontal, offset portion 214 also provides a support for a loop 216 at the rear of the receptacle 204 to thereby maintain the receptacle 204 above the support surface for the device 162.

As an alternative to using a receptacle 204 for accumulating debris that is picked up, a discharge chute 218 can be attached to the connector 46 to redeposit mulched debris back onto the support surface for the device 162. The discharge chute 218 consists of a 90° elbow 220 having a fore and aft leg 222 and a laterally directed leg 224. The fore and aft leg 222 is sufficiently long that the leg 224 projects laterally rearwardly of the undercarriage 166 so as not to deposit debris on the undercarriage 166.

The distal end 226 of the leg 224 supports an extension 228 having a flared free end 230 which causes a spreading out of the discharging debris to effect an even distribution thereof over the support surface on which the device 162 is carried.

An optional fender 232 conforms to the outer surface of the fuel tank 234 on the portable blower/vacuum unit 12 to prevent contact with objects that might potentially rupture the fuel tank 234.

In FIGS. 12-14, a modified form of a combination device is shown at 240, that is substantially the same as the device 162 shown in FIG. 10, with the only modifications thereto being to the hood/shroud 242, which is shaped substantially the same as the hood/shroud 168 on the device 162. The differences lie in the provision of a) a port 244 with a connector 246 for a flexible tube 248 in the front wall 250 of the hood/shroud 242; and b) the provision of a converter plate 252 for selectively sealing/blocking the inlet opening 254 at the bottom of the hood/shroud 242, to allow suction to be maximized at the port 244.

More specifically, the port 244 is defined approximately mid-way between the top and bottom of the hood/shroud 242. The connector 246 is an annular flange which surrounds the port 244 and is dimensioned to fit closely within one end 256 of the flexible tube 248. With the tube end 256 secured to the flange/connector 246, an adjustable hose clamp 258 can be used to captively maintain the tube end 256 on the connector/flange 246.

By operatively connecting the flexible tube 248 to the hood/shroud 242, suction can be developed at the distal end 260 of the tubing 248. To facilitate controlled pickup of debris, the distal end 260 of the tubing 248 is provided with a hand-holdable attachment 262 that has a fixed shape. The attachment 262 is provided with a handle 264 to allow the user to precisely place the free, distal end 266 of the attachment 262 over debris to be picked up in tight places, as between trees and in bushes, etc. The entire length of the flexible tube 248 preferably has an accordion-type construction so that it is readily stretchable, collapsible, and bendable to facilitate unhindered repositioning of the attachment 262 by the user within a large radius determined by the length of the tube 248.

To maximize suction at the port 244 and thereby at the free end 266 of the attachment 262, the inlet opening 254 of the hood/shroud is blocked by the converter plate 252. The converter plate 252 has a generally U-shaped configuration with a base wall 268 matched substantially to the inlet opening cross section 254 and upstanding flanges 270, 272 which facially abut a forwardly facing surface 274 on the front wall 250 and a rearwardly facing surface 276 on the rear wall 278 of the hood/shroud 242.

The converter plate 252 is placed into and removed from its operative position by laterally sliding the plate 252 relative to the hood/shroud 242. Once the converter plate 252 is centered on the hood/shroud 242, it can be releasably held in position by bolts 280 extending through the converter plate 252 and into the hood/shroud 242. The bolts have wing-shaped heads 282 to facilitate the connection and disconnection of the converter plate 252.

With the converter plate 252 removed, the device 240 is operable in the same fashion as the device 162. To maximize suction at the hood/shroud inlet opening 254 with the converter plate 252 removed, a cap 284 can be placed over the connector/flange 246 to block the port 244.

The device 240 in FIGS. 12-14 is in fact a preferred form of the invention in that it is the most versatile of the embodiments shown herein. That is, one can selectively use: a) the portable blower/vacuum unit 12 separate from the undercarriage 166 as either a vacuum or a blower; b) the portable blower/vacuum unit 12 in combination with the undercarriage 166 as a mobile vacuum unit with the tube 248 removed from the hood/shroud 242; and c) the device 240 in the FIG. 14 configuration as a lightweight vacuum unit by employing the attachment 262 without having to physically lift the portable blower/vacuum unit 12.

The foregoing disclosure of specific embodiments is intended to be illustrative of the broad concepts comprehended by the invention.

I claim:

1. In combination:
   (a) a portable vacuum unit usable independently in a portable vacuum mode, said portable vacuum unit comprising:
      a housing defining an intake opening into which debris to be picked up is drawn and an outlet opening in communication with the intake opening;
      means for developing suction at the intake opening and for directing debris drawn through the intake opening to the outlet opening for expulsion thereat; and
   (b) a mobile support for the portable vacuum unit, said mobile support comprising;
      a frame; and
      means on the frame for facilitating movement of the mobile support against and relative to a subjacent surface carrying the mobile support,
      there being cooperating means on the mobile support and portable vacuum unit for releasably holding the portable vacuum unit in an operative position on the mobile support wherein the portable vacuum unit can be used to develop a suction force to continuously draw debris toward said intake opening as said frame is moved over a subjacent surface on which the mobile support is carried,
      said portable vacuum unit being selectively releasable from the mobile support to allow the portable vacuum unit to be used in the portable vacuum mode independently of the mobile support.

2. The combination according to claim 1 wherein the portable vacuum unit has a carrying handle to facilitate its manipulation during use in the portable vacuum mode.

3. The combination according to claim 1 including an intake tube/conduit and means for releasably attaching the intake tube/conduit to the portable vacuum unit in its portable vacuum mode.

4. The combination according to claim 1 wherein the cooperating means comprises a rim on each of the portable vacuum unit and mobile support, said rims being fit one within the other with the portable vacuum unit in its operative position on the mobile support.

5. The combination according to claim 4 including means for releasably maintaining the rims, one within the other.

6. The combination according to claim 1 wherein the mobile support has a pickup hood/shroud with an internal chamber and an inlet opening, said portable vacuum unit intake opening being in communication with the hood/shroud inlet opening through the internal hood/shroud chamber with the portable vacuum unit in its operative position so that debris picked up at the hood/shroud inlet opening is drawn through the hood/shroud chamber and the housing intake opening to be expelled at the outlet opening.

7. The combination according to claim 1 including a receptacle for debris expelled at the outlet opening.

8. The combination according to claim 1 including a discharge chute, means for establishing communication between the discharge chute and the outlet opening of the portable vacuum unit and means on the discharge chute for controllably directing debris from the outlet opening of the portable vacuum unit onto a subjacent surface on which the mobile support is carried.

9. The combination according to claim 1 including means on at least one of the portable vacuum unit and mobile support for cutting debris picked up by the portable vacuum unit before being expelled through the outlet opening.

10. The combination according to claim 9 wherein the suction developing means includes a rotatable impeller and the cutting means rotates with the impeller.

11. The combination according to claim 6 including means on the hood/shroud for connecting a tube to the hood/shroud and for establishing communication between the hood/shroud chamber and the tube.

12. The combination according to claim 11 in combination with a converter plate and means for releasably connecting the converter plate to the hood/shroud to block the inlet opening in the hood/shroud to maximize suction in a tube connected to the hood/shroud.

13. The combination according to claim 11 in combination with a tube that is connectable to the hood/shroud.

14. The combination according to claim 6 wherein there are a plurality of wheels on the mobile support and including means for adjusting the position of at least one of the wheels relative to the frame to thereby vary the height of the hood/shroud inlet opening relative to a subjacent surface on which the mobile support is carried.

15. In combination:
(a) a portable vacuum unit usable independently in a portable vacuum mode, said portable vacuum unit comprising:
a housing defining an intake opening into which debris to be picked up is drawn and an outlet opening in communication with the intake opening;
means for developing suction at the intake opening and for directing debris drawn through the intake opening to the outlet opening for expulsion thereat; and
(b) a mobile support for the portable vacuum unit, said mobile support comprising;
a frame; and
wheeled means on the frame for facilitating rolling movement of the mobile support relative to a subjacent surface carrying the mobile support,
there being cooperating means on the mobile support and portable vacuum unit for releasably holding the portable vacuum unit in an operative position on the mobile support wherein the portable vacuum unit intake opening can be used to develop a suction force to continuously draw debris toward said intake opening as said frame is moved over a subjacent surface on which the mobile support is carried,
said portable vacuum unit being selectively releasable from the mobile support to allow the portable vacuum unit to be used in the portable vacuum mode independently of the mobile support.

16. The combination according to claim 15 wherein the portable vacuum unit has a carrying handle to facilitate its manipulation during use in the portable vacuum mode and the mobile support has a second handle, separate from the carrying handle on the portable vacuum unit, to facilitate rolling movement of the mobile support relative to a subjacent surface carrying the mobile support.

17. The combination according to claim 16 including a receptacle for debris expelled at the outlet opening and there are means for connecting the receptacle to the second handle to hold the receptacle in an operative position on the mobile support.

18. The combination according to claim 15 wherein the cooperating means on the mobile support and portable vacuum unit comprises an annular rim, one each on the mobile support and portable vacuum unit and f it, one radially within the other, with the portable vacuum unit in its operative position so that the rims are coaxial and there is a clamp that surrounds the radial outermost of the rims and urges the radial outermost rim radially into frictional engagement with the radial innermost rim.

19. The combination according to claim 18 wherein the clamp is adjustable.

20. A vacuuming apparatus comprising:
a mobile support;
a hood/shroud having an inlet opening, an internal chamber in communication with the inlet opening, and an outlet opening;
means for mounting the hood/shroud to the mobile support so that the hood/shroud inlet opening is in close proximity to a subjacent surface on which the mobile support is carried;
means for developing suction at the inlet opening of the hood/shroud to cause debris picked up at the hood/shroud inlet opening to be communicated through the hood/shroud chamber to the hood/shroud outlet opening;
means for connecting a tube to the hood/shroud and for establishing communication between the tube connected to the hood/shroud and internal hood/shroud chamber; and
means for selectively blocking the hood/shroud inlet opening to maximize suction developed in a tube connected to the hood/shroud in communication with the hood/shroud internal chamber.

21. The vacuuming apparatus according to claim 20 in combination with a tube that can be connected to the hood/shroud in communication with the hood/shroud internal chamber.

22. The vacuuming apparatus according to claim 20 wherein the means for establishing communication between a tube and the internal hood/shroud chamber includes aport in the hood/shroud and means are provided for selectively blocking the port in the hood/shroud, said port blocking means comprising a cap that can be pressed into a blocking position over the port on the hood/shroud.

23. The vacuuming apparatus according to claim 21 further including an attachment for the tube and having a handle to facilitate manipulation of the attachment.

* * * * *

UNITED STATES PATENT AND TRADEMARK OFFICE
CERTIFICATE OF CORRECTION

PATENT NO. : 5,294,063
DATED : March 15, 1994
INVENTOR(S) : Scott J. Rote

It is certified that error appears in the above-indentified patent and that said Letters Patent is hereby corrected as shown below:

On the title page, Item [75] Inventor: should read
--Scott J. Rote, Lindenhurst, III.--

Signed and Sealed this

Twelfth Day of July, 1994

*Attest:*

BRUCE LEHMAN

*Attesting Officer*   Commissioner of Patents and Trademarks